United States Patent [19]

Carré et al.

[11] Patent Number: 4,503,949

[45] Date of Patent: Mar. 12, 1985

[54] DRUM BRAKE AND THE SPACER FOR SUCH A BRAKE

[75] Inventors: Jean-Jacques Carré, Le Raincy; Pierre Pressaco, La Courneuve; Jean-Claude Méry, Pavillons sous Bois, all of France

[73] Assignee: Societe Anonyme D.B.A., Paris, France

[21] Appl. No.: 438,192

[22] Filed: Nov. 1, 1982

[51] Int. Cl.³ .............................................. F16D 65/56
[52] U.S. Cl. ........................ 188/79.5 P; 188/196 BA
[58] Field of Search ...................... 188/79.5 P, 79.5 B, 188/79.5 GC, 79.5 R, 196 BA; 192/111 A; 411/89, 326, 331

[56] References Cited

U.S. PATENT DOCUMENTS

| 2,570,398 | 10/1951 | Smith | 188/79.5 B |
| 2,818,143 | 12/1957 | Phillips | 188/79.5 B |
| 3,794,145 | 2/1974 | Margetts | 188/79.5 P |
| 4,148,380 | 4/1979 | Haraikawa | 188/79.5 |
| 4,390,086 | 6/1983 | Conrad | 188/79.5 B |

FOREIGN PATENT DOCUMENTS 2653677 1/1978 Fed. Rep. of Germany .
2433678 3/1980 France .

Primary Examiner—Bruce H. Stoner, Jr.
Assistant Examiner—Michael P. Gilday
Attorney, Agent, or Firm—Larry J. Palguta; K. C. Decker

[57] ABSTRACT

The brake comprises two shoes lined with friction elements stressed by a clamping mechanism located between two first ends of the shoes, a fixed anchoring block located between the other two ends of the shoes, and a spacer (44) mounted in the vicinity of the clamping mechanism and bearing by each of its ends on each of the shoes. The spacer comprises a device for automatic lengthening as a function of the wear of the friction elements and consists of a screw/nut system (66–72) controlled by a pawl (84) stressing a toothing (74) fixed to one of the elements (72) of the screw/nut system (66–72), and is characterized in that the pawl (84) is carried by an elastic blade (80) fixed to the spacer (44), the blade (80) being held elastically apart from the spacer (44) via a rocking lever (79) mounted on the spacer, the lever (79) enabling, by rocking, the blade (80) and the spacer (44) to approach one another when the shoes are stressed apart from one another, thus allowing the pawl (84) to rotate the nut (72) and increase the length of the spacer (44).

20 Claims, 8 Drawing Figures

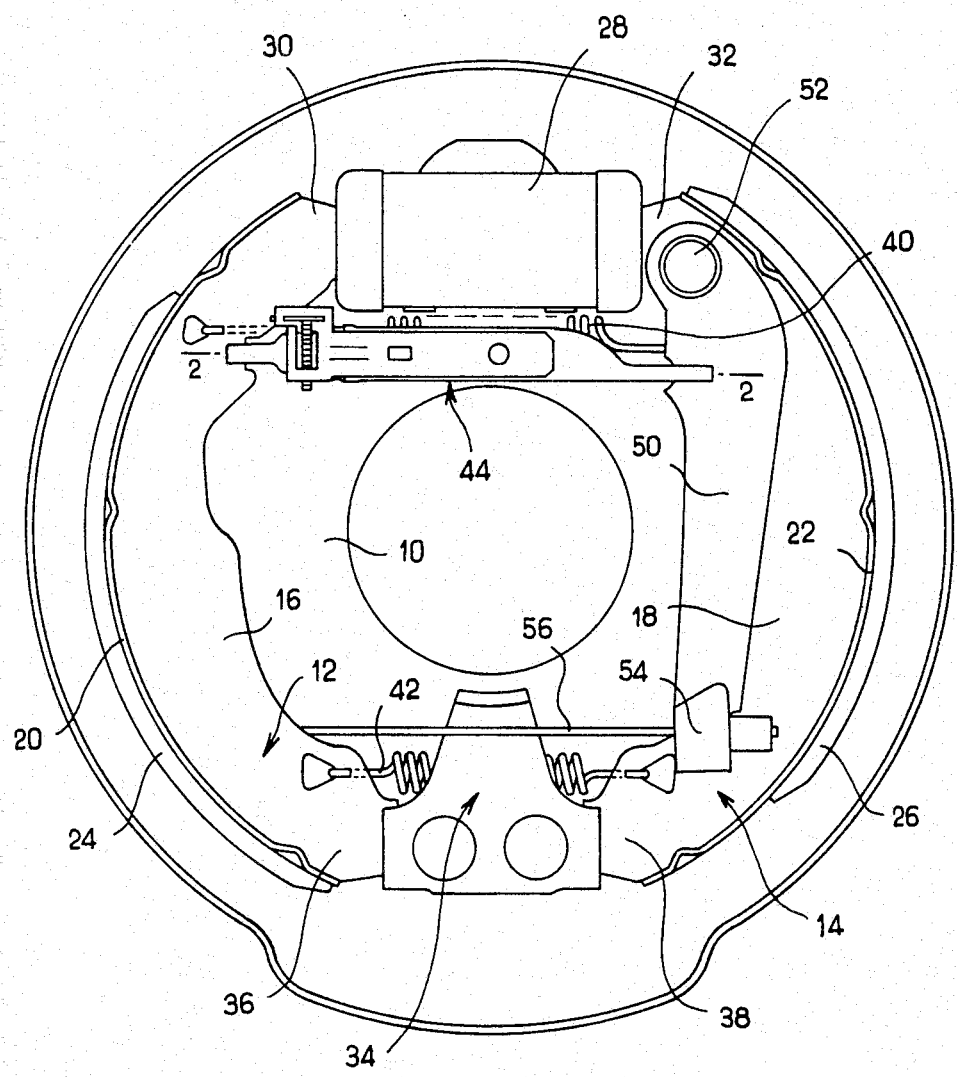
FIG_1

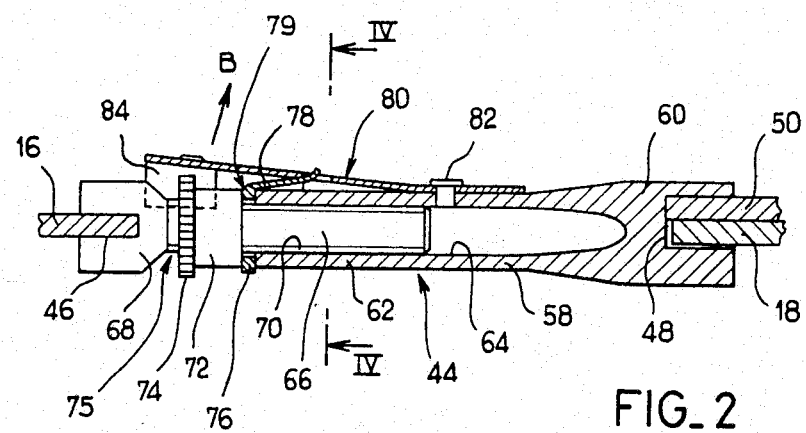
FIG_2
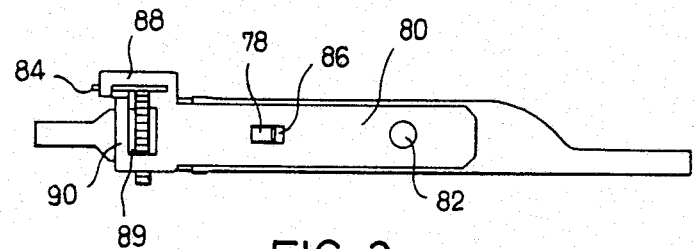
FIG_3
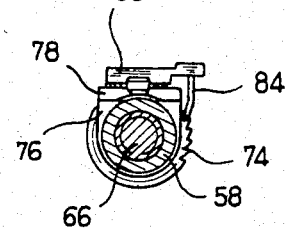
FIG_4
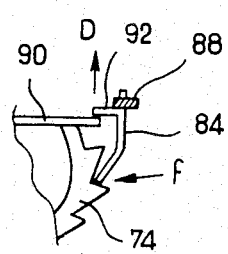
FIG_5
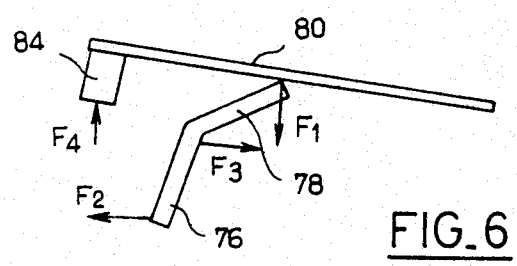
FIG_6

DRUM BRAKE AND THE SPACER FOR SUCH A BRAKE

The invention relates to a drum brake designed especially for equipping a motor vehicle.

The invention relates, in particular, to a drum brake equipped with an automatic adjustment device intended for automatically compensating the wear of the friction linings associated with the brake shoes in order to maintain the travel at the level of the brake pedal and the mechanical control, if the brake is equipped with this, which is necessary for operating the latter at a substantially constant and low level.

Many drum brakes equipped with automatic adjustment devices are known, but most of these devices have a certain number of disadvantages. In particular, these devices most often ensure adjustment without distinguishing between the increase in the spacing between the shoes resulting from the wear of the linings and that which results from the expansion of the drum caused by heating of the brake. To avoid the risks of overadjustment which stem from this, it is customary to provide a substantial functional play to which corresponds a large idle travel at the level of the brake control pedal. Among the known drum brakes there is, however, a brake which makes it possible to eliminate this disadvantage almost completely. This brake is described in U.S. Pat. No. 2,570,398 in which the automatic adjustment device consists of a ratchet system acting on a screw/nut system so as to lengthen a spacer in proportion to the wear of the friction elements. The stepping-down obtained by this device permits adjustment by successive approximations, and therefore makes it possible to avoid overadjustment as a result of temporary heating.

In a brake of this type, the double consequence of using the wheel cylinder is to apply the friction linings associated with the shoes against the brake drum and to cause the adjusting pawl to pivot by a value corresponding to the play existing between the shoes and the drum. If the play is sufficient to justify adjustment, the pawl engages the following tooth of the toothed wheel, and at the return, when the brake is released, the pawl will make the nut of the screw/nut system rotate by the value corresponding to the tooth passed. This device makes it possible to obtain adjustment limited to low values as a result of the stepping-down achieved by the screw/nut system, so that it prevents the overadjustments inherent in most of the other known adjustment devices. Thus, the brake which has just been described can, in practice, follow only very slow phenomena which are phenomena connected with wear.

However, this device has the disadvantage that, on the one hand, it has a relatively large number of components of small dimension and, on the other hand, it possesses elements fixed to one of the shoes and elements fixed to the spacer, and the assembly of such a brake as well as the possible work carried out during the lifetime of this brake are complicated and risk causing damage to the components which could be detrimental to the normal operation of this device.

The invention proposes a drum brake having the advantages of the brake just described, especially as regards elimination of the risks of overadjustment of the brake, and in which the disadvantages of assembly and the risk of damage during the lifetime of the brake are avoided.

With this aim in view, the invention proposes a drum brake with automatic adjustment comprising two shoes lined with friction elements which are capable of being stressed to engage frictionally against a rotating drum by clamping means located between two first ends of the shoes, a fixed anchoring block located between the other two ends of the shoes, a spacer mounted in the vicinity of the clamping means and bearing by each of its ends on each of said two shoes, said spacer comprising a device for automatic lengthening as a function of the wear of the friction elements formed by a screw/nut system controlled by a pawl stressing a toothing fixed to one of the elements of the screw/nut system, characterized in that said pawl is carried by an elastic blade fixed to said spacer, said blade being held elasticaly apart from said spacer, with the brake at rest, via a rocking lever mounted on said spacer, said lever enabling, by rocking, said blade and said spacer to approach one another when said shoes are stressed apart from one another.

It is clear that, as a result of these characteristics, the automatic compensation device as a whole is contained within the spacer and, consequently, no special precaution is necessary at the time when this is assembled in the brake, the two ends of the spacer simply bearing on corresponding portions of the shoes in the same way as a spacer without automatic adjustment.

A preferred embodiment of the invention will now be described by way of non-limiting example with reference to the attached drawings in which:

FIG. 1 is a plan view of a drum brake produced according to the teaching of the present invention;

FIG. 2 is an enlarged view in a section along the line 2—2 of FIG. 1;

FIG. 3 is an enlarged view of the spacer shown in FIG. 1;

FIG. 4 is a sectional view of the spacer along the line 4—4 of FIG. 2;

FIG. 5 shows the assembly of the pawl on the elastic blade; and

FIG. 6 shows a diagrammatic view of the lever and the pawl, illustrating the distribution of forces during operation of the automatic adjustment device.

Figure 8:
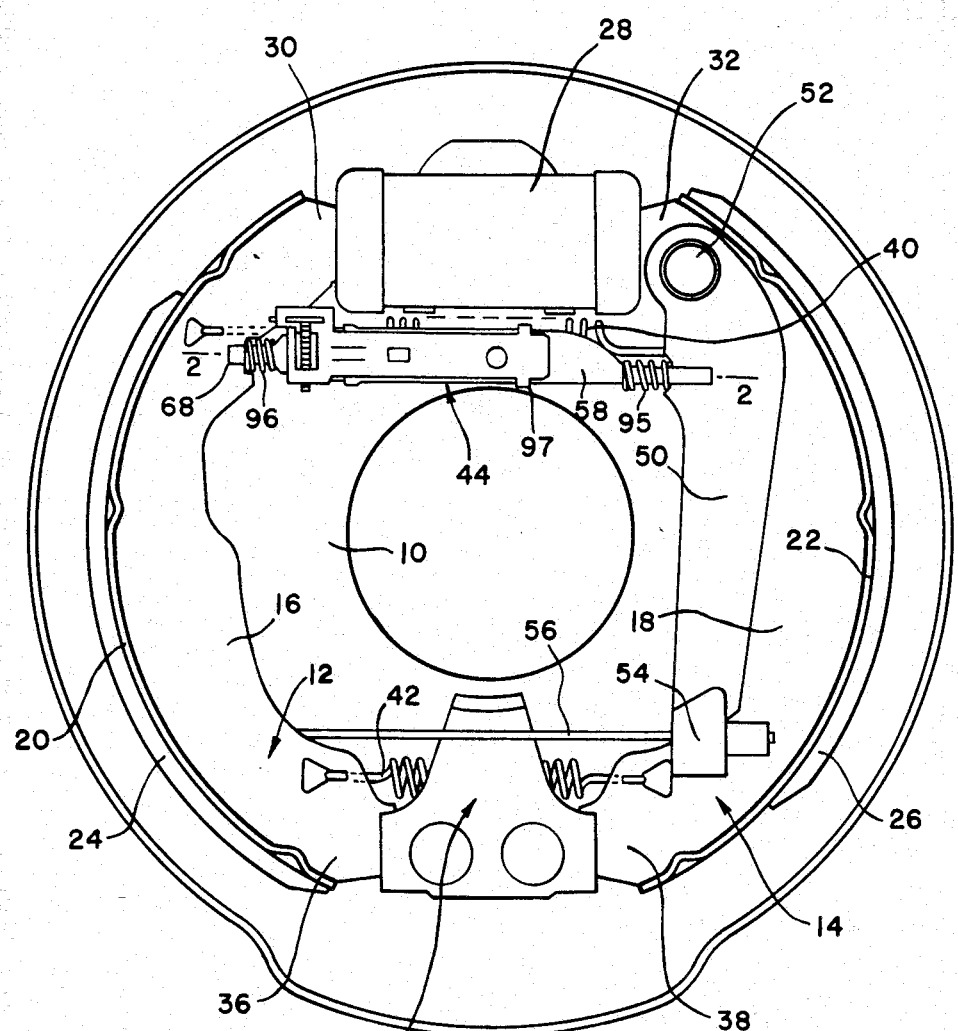
FIGS. 7 and 8 show alternative embodiments with additional springs.

The drum brake shown in FIG. 1 has a support plate 10 which is designed to be associated with a fixed part of the vehicle (not shown) and on which two brake shoes 12 and 14 are received so as to slide thereon. Each of the shoes 12 and 14 comprises a substantially flat web 16, 18 and a curved rim 20, 22 on which a friction element 24, 26 respectively is mounted by means of rivets or the like. Clamping means consisting of a wheel cylinder 28 in the embodiment illustrated is located between the first two adjacent ends 30 and 32 of the shoes 12 and 14 respectively, and an anchoring block 34 associated with the support plate 10 is located between the other two ends 36 and 38 of the shoes 12 and 14. Furthermore, restoring springs 40 and 42 are arranged respectively in the vicinity of the wheel cylinder 28 and the anchoring block 34, so as to stress the ends 30 and 32 of the shoes against the wheel cylinder 28 and the ends 36 and 38 of the shoes against the anchoring block 34 respectively. As shown more precisely in FIGS. 1 and 2, the spacer 44 is located between the shoes 12 and 14 in the vicinity of the wheel cylinder 28, so as to define the distance which separates, at rest, the ends 30, 32 of the shoes. Each of the ends of the spacer 44 contains a U-shaped notch 46, 48 in which the webs 16 and 18 of the shoes 12 and 14 are received respectively. In the embodiment illustrated, the notch 48 also receives a hand brake lever 50 which is mounted pivotably on the end 32 of the shoe 14 by means of a rivet forming a pivot 52 and the free end 54 of which is folded to receive one end of a hand brake control cable 56, the other end (not shown) of which is intended to be connected to a control lever located in the compartment of the driver of the vehicle. As shown more particularly in FIG. 2, the spacer 44 is formed by a first element 58, one end 60 of which bears on the shoe 14 and on the hand brake lever 50. The other end 62 of the element 58 contains a bore 64 in which the end 66 of a bearing piece 68, in which the notch 46 is formed, is mounted so as to slide. The end 66 of the piece 68 is provided with a thread 70 on which is mounted a nut 72 which has a toothing 74 on its periphery, the piece 66 and the nut 72 forming the second element 75 of the spacer 44. A washer 76 carrying an arm 78 is located between the nut 72 and the end 62 of the first element 58. The washer 76 and the arm 78 form a lever assembly 79. By its free end this arm 78 forces apart, in the direction of the arrow B of FIG. 2, an elastic blade 80 fixed to the spacer 44 and more precisely to the first element 58 by means of rivet 82. The blade 80 carries the pawl 84 which interacts with the toothing 74. In the embodiment illustrated, and with reference to FIGS. 2 and 3, it will be seen that the free end of the arm 78 is bent back and penetrates into an aperture 86 made in the blade 80 to maintain alignment between the blade 80 and the spacer 44 and to immobilize the washer 76 as regards rotation relative to the first element 58. Alternatively, side projections 97 on blade 80 engage the element 58 to maintain alignment therebetween (see FIG. 8). Referring to FIG. 3, it will be seen that the blade 80 has at its end located opposite the toothing 74 an aperture 89 capable of positioning itself on either side of this toothing when the blade 80 approaches the spacer 44, thus limiting the relative displacement of the first element 58 and second element 75 of the spacer 44.

Referring to FIG. 4, it will be seen that the end of the pawl 84 is bent back so as to penetrate into the toothing 74.

Referring to FIG. 5 in which the pawl 84 is shown attached to the blade 80, it will be seen that this pawl is retained between an arm 88 and an arm 90 of the blade 80. The arm 90 stresses a portion 92 of the pawl 84 in the direction of the arrow D and, as a result of rocking about the arm 88, generates a force f on the pawl 84 so as to engage the toothing 74 of the nut 72.

The drum brake which has just been described with reference to FIGS. 1 to 4 operates in the following way:

At rest, when the friction linings 24 and 26 are new, the various elements forming the brake occupy the positions shown in FIGS. 1 to 4. In particular, the spring 40 which stresses the shoes 16 and 18 towards one another lays the washer 76 against, on the one hand, the nut 72 and, on the other hand, the end 62 of the first element 58. The arm 78 forming a lever moves the elastic blade 80 apart from the spacer 44. When the wheel cylinder 28 is operated, the ends 30 and 32 of the shoes 12 and 14 are stressed apart from one another in such a way that the friction linings 24 and 26 are made to engage with the brake drum (not shown) so as to create a braking torque. Simultaneously, under the action of the blade 80 which bears on the arm 78, the washer 76 moves into a transverse position because of the play existing between it and the screw 66 and moves apart the first element 58 and the nut 72 and therefore keeps the element 58 in contact with the web 18 of the shoe 14 by means of the hand brake lever 50, on the one hand, and keeps the bearing piece 68 in contact with the web 16 of the shoe 12, on the other hand. Since the arm 78 has tilted towards the spacer 44, it enables the blade 80 also to approach the spacer 44. As may be seen more particularly in FIG. 4, the pawl 84 engaged in the toothing 74 causes the latter to pivot in the direction of the arrow C, and therefore the nut 72, until the blade is again immobilised by the arm 78. Since the nut 72 has rotated relative to the bearing piece 68, this rotation takes place in a direction corresponding to the lengthening of the spacer 44 and thus slightly increases the distance which separates, at rest, the ends 30 and 32 of the shoes 12 and 14.

When the brake is released, the restoring spring for the shoes 40 brings the bearing piece 68 and therefore the nut 72 nearer to the first element 58. This bringing nearer causes tilting of the washer 76 which returns to its position as shown in FIG. 2. The arm 78 forming a lever lifts the blade 80 in the direction of the arrow B. The friction occurring between the nut 72 and the washer 76 prevents the toothing 74 and therefore the nut 72 from being driven by the pawl 84.

When the wear of the friction elements increases, the washer 76 tilts more and more, the arm 78 allows the blade 80 to move nearer and nearer to the spacer 44 and therefore, when a predetermined limit is reached, the pawl 84, on its return to the position of rest, will engage the following tooth of the toothing 74, thus making it possible to lengthen the spacer 44 again during subsequent braking operations.

As shown more particularly in the diagram 6, the blade 80 applies a force $F_1$ to the end of the arm 78 and, as a result of tilting of the washer 76, generates two forces $F_2$ and $F_3$ applied respectively to the nut 72 and to the end 62 of the element 58. These forces $F_2$ and $F_3$ form an anti-rotation device for the nut 72. When the pawl 84 comes to bear on a tooth of the toothing 74, a reaction force $F_4$ is applied to the pawl 84, the force stored in the blade 80 is distributed between $F_4$ and $F_1$, and $F_1$ is therefore reduced, as are the forces $F_2$ and $F_3$, and, the anti-rotation force of the nut diminishing until it is possibly nullified, the latter is driven more easily by the pawl 84. When the progress of the pawl ceases, the force $F_4$ is nullified and the nut is again immobilized by the forces $F_2$ and $F_3$, $F_1$ resuming the total value of the force stored by the blade 80.

Figure 7:
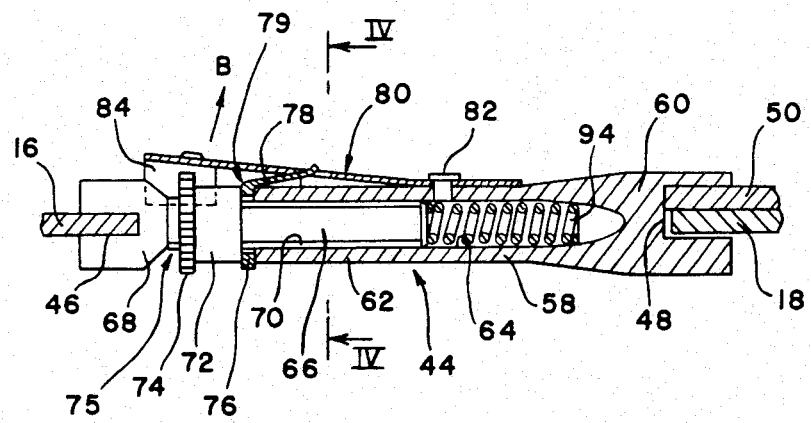

In another embodiment shown in FIG. 7, there is an additional spring 94 located in the bore 64 of the first element 58 and acting on the end 66 of the piece 68 so as to reinforce the bearing of the pieces 68 and 58 of the spacer 44 on the shoes 12 and 14.

In another embodiment shown in FIG. 8, a spring 95 is mounted between the piece 58 and the shoe 14, on the one hand, and a spring 96 mounted between the piece 68 and the shoe 12, on the other hand.

It goes without saying that the drum brake which has just been described by way of example does not limit the scope of the invention and that the latter can apply to various alternative forms as regards both the type of brake control means and the possible omission of the hand brake lever. Modifications can also be envisaged in the adjustment device itself, especially as regards the structure and shape of the various elements forming it. In particular, the pawl can be attached to the elastic blade or be an integral part of this, and likewise the blade can be centered relative to the spacer by projections formed on the blade and interacting with corresponding portions of the spacer.

We claim:

1. A drum brake with automatic adjustment, comprising two shoes lined with friction elements capable of being stressed to engage frictionally against a rotating drum by clamping means located between two first ends of the shoes, a fixed anchoring block located between the other two ends of the shoes, a spacer mounted in the vicinity of the clamping means and bearing at each end on one of said shoes, said spacer comprising a device for automatic lengthening as a function of the wear of the friction elements and formed by a screw/nut system controlled by a pawl stressing a toothing fixed to an element of the screw/nut system, characterized in that said pawl is carried by an elastic blade attached to said spacer, a portion of said blade being held elastically apart from said spacer, with the brake at rest, via a rocking lever mounted on said spacer, said rocking lever enabling, by rocking, said blade and spacer to approach one another when said shoes are stressed apart from one another, the lever being formed by a washer prolongated by an arm forming an angle greater than ninety degrees relative to said washer.

2. The drum brake according to claim 1, characterized in that said washer is located between a first element of said spacer and a second elment of said spacer forming said screw/nut system.

3. The drum brake according to claim 2, characterized in that said washer is located between the nut of the screw/nut system and one end of said first element of said spacer.

4. The drum brake according to claim 3, characterized in said washer being mounted with diametral play on the screw of the screw/nut system.

5. The drum brake according to claim 1, characterized in that the portion of said elastic blade is held elastically apart from said spacer by means of said arm bearing on said blade at a point located between said pawl and a fixing part of said blade used to fasten the blade to said spacer.

6. The drum brake according to claim 5, characterized in that said washer generates by means of the blade frictional forces on the nut of said screw/nut system to form an anti-rotation device for the system, and said frictional forces diminish and can be nullified when said pawl bears on the toothing.

7. The drum brake according to claim 5, characterized in that said blade is fixed to an element of said spacer.

8. The drum brake according to claim 7, characterized in that said blade is fixed to said element by means of a rivet.

9. The drum brake according to claim 5, characterized in that said blade stresses apart a first element and a second element of said spacer via said lever, the washer of said lever being capable of tilting relative to the screw of the screw/nut system.

10. The drum brake according to claim 1, characterized in that a spring is mounted within a bore formed in a first element of said spacer so as to force apart the ends of said spacer.

11. The drum brake according to claim 1 characterized in that a spring is mounted between each end of said spacer and the adjacent shoe.

12. A drum brake with automatic adjustment, comprising two shoes lined with friction elements capable of being stressed to engage frictionally against a rotating drum by clamping means located between two first ends of the shoes, a fixed anchoring block located between the other two ends of the shoes, a spacer mounted in the vicinity of the clamping means and bearing at each end on one of said shoes, said spacer comprising a device for automatic lengthening as a function of the wear of the friction elements and formed by a screw/nut system controlled by a pawl stressing a toothing fixed to an element of the screw/nut system, characterized in that said pawl is carried by an elastic blade attached to said spacer, a portion of said blade being held elastically apart from said spacer, with the brake at rest, via a rocking lever mounted on said spacer, said rocking lever enabling, by rocking, said blade and spacer to approach one another when said shoes are stressed apart from one another, a stop being formed in said blade and interacting axially with said toothing of said screw/nut system so as to form an assembly removable as one piece, the stop being formed by an aperture in the blade.

13. The drum brake according to claim 12 characterized in that said pawl is mounted pivotably on an end of said blade, and an arm formed on said blade forces said pawl to engaged with the toothing.

14. The drum brake according to claim 12 characterized in that said blade contains an opening which interacts with said lever so as to maintain alignment between the blade and the spacer.

15. A drum brake with automatic adjustment, comprising two shoes lined with friction elements capable of being stressed to engage frictionally against a rotating drum by clamping means located between two first ends of the shoes, a fixed anchoring block located between the other two ends of the shoes, a spacer mounted in the vicinity of the clamping means and bearing at each end on one of said shoes, said spacer comprising a device for automatic lengthening as a function of the wear of the friction elements and formed by a screw/nut system controlled by a pawl stressing a toothing fixed to an element of the screw/nut system, characterized in that said pawl is carried by an elastic blade attached to said spacer, a portion of said blade being held elastically apart from said spacer, with the brake at rest, via a rocking lever mounted on said spacer, said rocking lever enabling, by rocking, said blade and spacer to approach one another when said shoes are stressed apart from one another, a stop being formed in said blade and interacting axially with said toothing of said screw/nut system so as to form an assembly removable as one piece, the blade including two projections which interact with said spacer so as to maintain alignment between the blade and spacer.

16. A spacer for the drum brake according to claim 1, characterized in that a stop formed in said blade interacts axially with said toothing of said screw/nut system so as to form an assembly removable as one piece.

17. The spacer according to claim 16, characterized in that said stop is formed by an aperture in the blade.

18. The spacer according to claim 16, characterized in that said pawl is mounted pivotably on an end of said blade, and an arm formed on said blade forces said pawl to engage with the toothing.

19. The spacer according to claim 16, characterized in that said blade contains an opening which interacts with said lever so as to maintain alignment between the blade and spacer.

20. The spacer according to claim 16, characterized in that said blade includes two projections which interact with said spacer so as to maintain alignment between the blade and the spacer.

* * * * *